A. S. KLOCK
CHAIN HOOK.
APPLICATION FILED JAN. 21, 1914.

1,130,613.　　　　　　　　　　　　Patented Mar. 2, 1915.

WITNESSES:　　　　　　　　　　　　INVENTOR.
　　　　　　　　　　　　　　　　　　A. S. Klock,
　　　　　　　　　　　　　　　　BY　A. S. Pattison,
　　　　　　　　　　　　　　　　　　　ATTORNEYS.

UNITED STATES PATENT OFFICE.

ARDEN S. KLOCK, OF DULUTH, MINNESOTA, ASSIGNOR OF ONE-HALF TO EDWARD G. HILLIARD, OF DULUTH, MINNESOTA.

CHAIN-HOOK.

1,130,613.  Specification of Letters Patent.  Patented Mar. 2, 1915.

Application filed January 21, 1914. Serial No. 813,597.

*To all whom it may concern:*

Be it known that I, ARDEN S. KLOCK, a citizen of the United States, residing at Duluth, in the county of St. Louis and State of Minnesota, have invented certain new and useful Improvements in Chain-Hooks, of which the following is a specification, reference being had therein to the accompanying drawing.

My invention relates to improvements in chain hooks and pertains more particularly to hooks adapted to be used on tire chains used to prevent the slipping of the traction wheels of automobiles.

The object of my invention is to provide a hook of this character which is capable of adjustment and adapted to be readily removed or placed in position or adjusted as desired.

Another object of my invention is to provide a simple, cheap and more effective hook of this character which after being fastened can not be accidentally opened and which will endure the most severe shocks to which its use would subject it.

Figure 1:
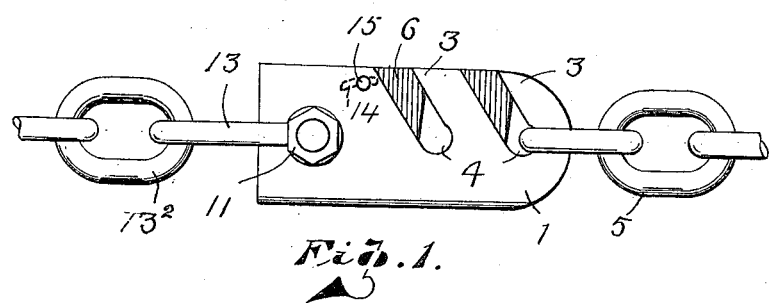
Figure 2:
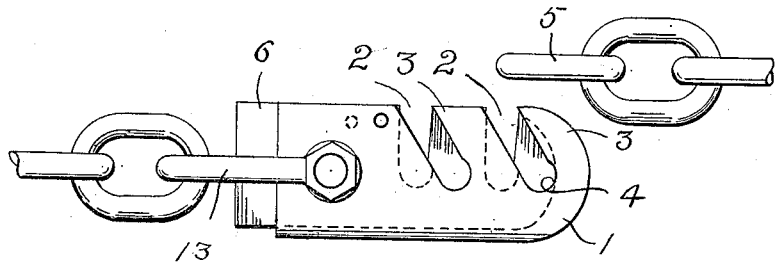
Figure 3:
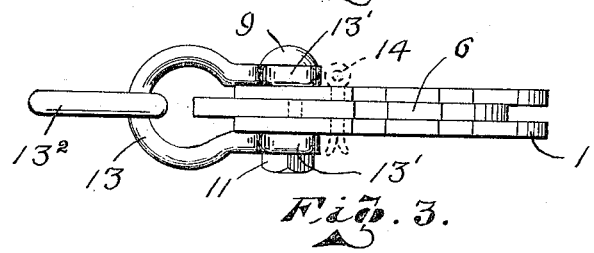
Figures 4, 5, 6:
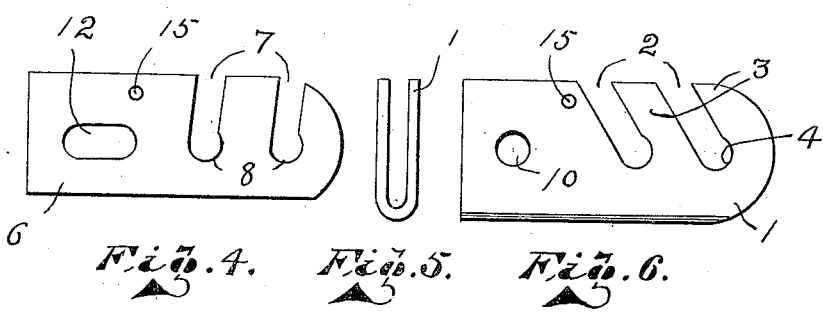

Referring now to the drawings: Figure 1 is a side elevation of a hook showing the link of the chain in one position therein. Fig. 2 is a side elevation of Fig. 1 showing the chain released and the hook open. Fig. 3 is a top plan view of Fig. 2. Fig. 4 is a side elevation of the sliding locking member of the hook. Fig. 5 is an end view of the case of the hook and in which the sliding member is adapted to move. Fig. 6 is a side elevation of the enveloping member or case of the hook.

Referring now to the drawings, 1 represents the outer case of the hook which as shown is of an oblong form in side elevation and having a round outer end. This case as shown in Fig. 5 is of a U-shape in cross section and provided with a plurality of slots 2 forming the hooks 3. While I have shown the case 1 having two slots 2 forming two hooks, it will be understood that any desired number of slots can be used without departing from my invention. The slots 2 are designed to slant backward from the point of the attachment 4 in such a manner as to insure attachment to the chain 5.

Intermediate the walls or sides of the case 1 is a plate 6 which is of a shape and size to snugly fit within the case 1. This plate is provided with two slots which slant forward as shown in Fig. 4 of the drawings in a direction opposite to that of the slots 2 of the case and which are placed in such manner that the enlarged innermost parts 8 will register with the enlarged lower ends 4 of the slots 2, when the plate 6 is in closed position.

The case 1 is provided with an opening 10 through the walls thereof and the sliding lock plate 6 is provided with a slot 12 and passing through the opening 10 in the walls of the casing 1 and the slot 12 of the sliding lock member is a bolt 9 upon which the nut 11 is screwed and whereby the sliding lock member 6 is locked within the case against transverse movement but free to slide longitudinally therein. On the outside of the casing 1 is a clevis or loop 13 having eyes 13' to which the bolt 9 is secured and by means of which one end of the chain $13^2$ is secured. The other end of the chain may be attached at will to one of the hooks 3. The chain may be secured at its proper point of contact 4 by withdrawing the plate 6 to the point, as shown in Fig. 2, whereat the upper ends of the openings 2 of the case will coincide with the upper ends of the openings 7 of the plate 6 and, by the forward motion of the plate 6 within the case 1, the chain 5 will drop to its proper position within the orifices 4 and 8. The plate 6 may be held in this position by means of the cotter pin 14 passing through suitable holes in the parts of the hook, as at 15—15. It is understood that any other means of uniting the members may be used without departing from my invention.

Having thus fully described my invention what I claim and desire to secure by Letters Patent is:

1. A hook of the character described comprising a case having obliquely arranged slots extending rearwardly, and a sliding locking member mounted within the case and having obliquely arranged slots extending forward.

2. A hook of the character described comprising a case having obliquely arranged slots extending rearwardly, and a sliding locking plate having obliquely arranged slots, said plate mounted within the case and adapted to extend across the said slots in the case.

3. A hook of the character described comprising a case having obliquely arranged slots extending rearwardly, a sliding plate within the case, said plate having obliquely arranged slots and adapted to extend across the outer ends of the slots in the case, registering holes in the sliding member and in the case for the reception of a cotter-pin, providing means whereby the sliding plate may be positively locked in its forward position across the ends of the slots.

4. A hook of the character described comprising an elongated case U-shaped in cross section having obliquely arranged slots extending rearwardly, a plate sliding within said U-shaped case, said plate having obliquely arranged slots extending forwardly and the upper portions of the plate adapted to extend across the outer end of the obliquely arranged slots in the case, registering holes in the sliding member and in the case for the reception of a cotter-pin providing means for locking the plate in its outward position across the ends of the obliquely arranged slots.

5. A hook of the character described comprising a case U-shaped in cross section and having obliquely arranged slots extending rearwardly, a sliding plate within the said case, and having obliquely arranged slots extending forwardly, the upper portions of the sliding member adapted to entirely close the upper portions of the slots in the case, and means carried by the case and sliding member for the reception of a clevis.

6. A hook of the character described comprising a case U-shaped in cross section and having obliquely arranged slots extending rearwardly, a sliding plate within the case and having obliquely arranged slots extending forwardly, the upper portions of the sliding member adapted to totally close the upper portions of the slots in the case, registering holes, and a slot in the casing and sliding member respectively for the reception of the bolt of a clevis, and registering holes in the sliding member and case for the reception of a cotter-pin, the parts arranged as and for the purpose described.

In testimony whereof I hereunto affix my signature in the presence of two witnesses.

ARDEN S. KLOCK.

Witnesses:
W. H. DENHAM,
S. GEO. STEVENS.

Copies of this patent may be obtained for five cents each, by addressing the "Commissioner of Patents, Washington, D. C."